US012505491B2

(12) United States Patent
Navani et al.

(10) Patent No.: US 12,505,491 B2
(45) Date of Patent: Dec. 23, 2025

(54) ELECTRONIC COMMUNICATION PLATFORM AND APPLICATION

(71) Applicant: WorCFlo LLC, Milpitas, CA (US)

(72) Inventors: Annu Navani, Campbell, CA (US); Raj Navani, Campbell, CA (US); Rajiv Das, Milpitas, CA (US)

(73) Assignee: WorCFlo LLC, Milpitas, CA (US)

( * ) Notice: Subject to any disclaimer, the term of this patent is extended or adjusted under 35 U.S.C. 154(b) by 0 days.

(21) Appl. No.: 17/675,479

(22) Filed: Feb. 18, 2022

(65) Prior Publication Data

US 2022/0261917 A1 Aug. 18, 2022

Related U.S. Application Data

(60) Provisional application No. 63/150,991, filed on Feb. 18, 2021.

(51) Int. Cl.
*G06Q 40/08* (2012.01)
*G16H 10/60* (2018.01)
*G16H 50/20* (2018.01)

(52) U.S. Cl.
CPC .......... *G06Q 40/084* (2025.08); *G06Q 40/08* (2013.01); *G16H 10/60* (2018.01); *G16H 50/20* (2018.01)

(58) Field of Classification Search
CPC ...... G06Q 40/00; G06Q 40/08; G06Q 40/084; G16H 10/60; G16H 50/20
USPC ......................................................... 705/4
See application file for complete search history.

(56) References Cited

U.S. PATENT DOCUMENTS

| 7,337,121 B1* | 2/2008 | Beinat | G16H 50/50 |
| | | | 705/3 |
| 11,537,888 B2 | 12/2022 | Banisakher | |
| 2007/0027714 A1* | 2/2007 | Fenno | G16H 40/20 |
| | | | 705/2 |
| 2008/0214903 A1 | 9/2008 | Orbach | |

(Continued)

FOREIGN PATENT DOCUMENTS

WO 2014124002 A1 8/2014

OTHER PUBLICATIONS

[HTML] The impact of workplace factors on filing of workers' compensation claims among nursing home workers J Qin, A Kurowski, R Gore, L Punnett—BMC Musculoskeletal Disorders, 2014—Springer (Year: 2014).*

*Primary Examiner* — Lindsay M Maguire
(74) *Attorney, Agent, or Firm* — Sheppard Mullin Richter & Hampton LLP

(57) ABSTRACT

Systems and methods are provided for a medical software platform for enabling authenticated communications between various entities to, for example, expedite a worker compensation process between the entities. For example, the medical software platform can receive healthcare and claim data as it is determined and identify relevant parties and deadlines that need to receive the data and respond to the data. This information may be associated with a patient profile. The medical software platform can provide various end users with instructions and data on how to follow and navigate the care of a worker compensation patient. The medical software platform can reduce the overall time in providing timely treatment to the patients and ensure that all the entities involved in the care of the patient are all on the same page.

22 Claims, 8 Drawing Sheets

(56) References Cited

U.S. PATENT DOCUMENTS

| | | | |
|---|---|---|---|
| 2011/0099116 A1* | 4/2011 | Gabel | G06Q 10/00 |
| | | | 705/311 |
| 2016/0005320 A1 | 1/2016 | Decharms | |
| 2016/0350509 A1 | 12/2016 | Sharma | |
| 2017/0255754 A1* | 9/2017 | Allen | G06Q 40/08 |
| 2018/0193650 A1 | 7/2018 | Srivastava | |
| 2020/0342969 A1* | 10/2020 | White | G06Q 30/0206 |
| 2022/0237878 A1 | 7/2022 | Tartz | |
| 2022/0262518 A1* | 8/2022 | Navani | G16H 50/20 |

\* cited by examiner

ELECTRONIC COMMUNICATION PLATFORM AND APPLICATION

CROSS REFERENCE TO RELATED APPLICATIONS

This non-provisional patent application claims priority from U.S. patent application Ser. No. 63/150,991, filed Feb. 18, 2021, the contents of which are incorporated by reference in their entirety.

DESCRIPTION OF RELATED ART

Medical data is often time sensitive, yet the systems configured to provide medical data often delay transmission of the data. Better systems are needed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
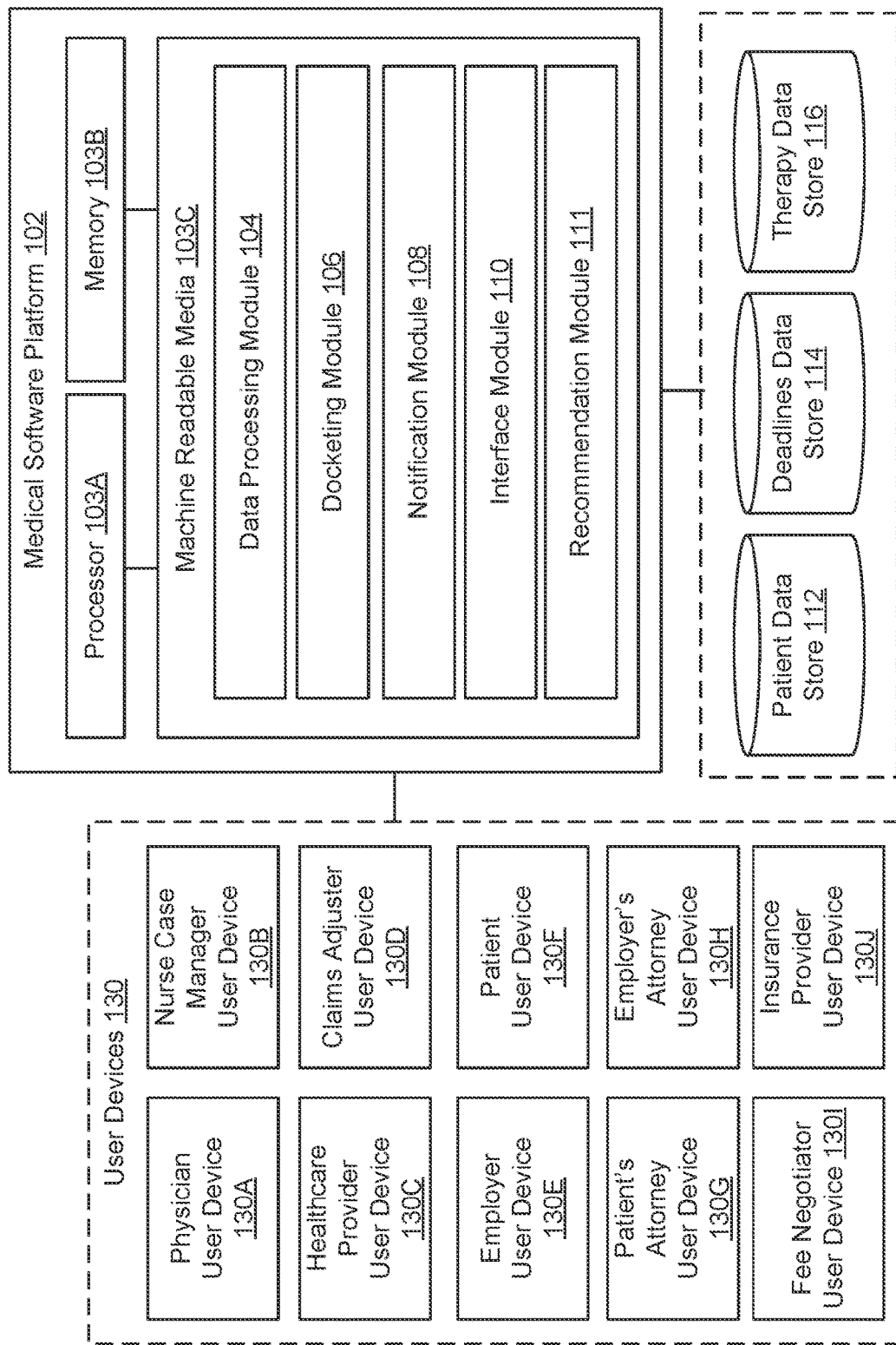
FIG. 1 illustrates a medical software platform and one or more user devices, in accordance with embodiments of the application.

The figures are not exhaustive and do not limit the present disclosure to the precise form disclosed.

DETAILED DESCRIPTION

Various medical data is used by various entities, including medical data related specifically to workers compensation injuries. For example, when workers get injured at work, they may file a worker's compensation claim against their employers for their injuries. Workers compensation is a form of insurance that can provide medical care or funds (e.g., wage replacement) to employees injured in the course of employment in exchange for mandatory relinquishment of the employee's right to sue his or her employer for the tort of negligence (e.g., associated with a dangerous work environment, etc.).

In some examples, portions of the workers compensation claim may be approved and transmitted to various entities. For example, the original workers compensation claim may be adjusted by insurance companies that authorize the medical care and provide disability payments to injured workers based on the policies purchased by employers.

There are several stakeholders that can impact the timelines and corresponding medical care provided under the workers compensation claim. For example, health care providers may treat the worker/patient or perform a health status evaluation (e.g., for medical or legal reasons). Other cases may involve claims adjusters from insurance companies that administer the medical and disability claims, nurse case managers to manage these medical and disability claims, applicant and defense attorneys to represent workers and insurance/employers respectively, utilization review teams to review any requests for authorization and/or authorize or deny care, third party administrators to provide claims processing and employee benefits management (e.g., in association or under contract to another company), interpreters, transportation companies, and the worker itself.

Currently, there is no organized system of communication or transfer of information between the various stakeholders, because each of these entities may have competing or common interests and may be responsible for securing their respective data. For example, there are several technical and legal limitations with current systems that restrict which recipients that can receive the information. Additionally, the injured workers may require timely care in order to heal from the work-related injury, which is more likely to occur when each of the entities are able to communicate quickly and transfer of information.

As an illustrative example in the workers compensation context, a claims adjuster entity is requested to review the medical treatment recommended by a physician entity within five business days by labor code law. Other information may be requested as well, including requesting medical legal evaluations from expert sources, like physicians or attorneys. These evaluations may be requested to be scheduled and completed in a timely fashion (e.g., five days). A "return-to-work" plan may also be requested to identify when the patient is predicted to be able to return to work and under particular conditions. The return-to-work plan may be constructed by the health care provider and transmitted immediately to the employer entity in order to plan the working environment accommodations for the patient (e.g., adjusted work scheduling, adjusted work location, etc.).

In each of these communication networks corresponding to different entities, different systems are used with different technological capabilities (e.g., phone calls vs. facsimile transmissions vs. electronic messaging, etc.) and transmitting messages between them often requires human intervention and time to translate the message from one format to another. With each of these time delays, depending on the patient's situation, the patient's health becomes worse and they are less likely to return to work at a full capacity and more likely to have a chronic pain disability.

Additionally, the first two years of disability are covered by the worker compensation insurance of the employer, the third year is covered by state disability, and after that expires, the patient is covered by social security disability. Research shows that delaying the return-to-work date by three months post injury or more can decrease the chance of return to work by fifty percent, which can result in chronic pain or permanent disability for the patient. However, much of this delay may be based on the technical limitations of the systems used by various, distributed entities in a plurality of industries and technical environments involved in the workers compensation process, as described herein. These and other technical limitations create an unnecessary delay of care leading to patient discomfort, delayed recovery, prolonged disability, and/or chronic pain. Additionally, chronic pain is a multisystem syndrome leading to physical debilitation, psychological disorders such as depression, anxiety, unemployability, financial strain, loss of sleep, sexual function, and ultimately very poor quality of life.

Further, when injured patients endure lengthy waits, their health may suffer, their condition could worsen, they may lose their financial footing, and some have even lost their homes. These patients may participate in a medical evaluation to determine whether the injury is work-related or other factors, including whether more treatment is needed or the patient wants a second opinion regarding temporary or permanent disability from work (e.g., relating to a worker compensation claim). When the patient (or the patient's attorney) asks for a medical review, the state provides a list of three experts to choose from, but also requires that the appointment takes place within sixty days. If a doctor performs the medical review in that timeframe, the patient may be given a fresh list and the process starts again. The number of communications between parties often delays the process with such an expedited time frame.

As another illustrative example, a physician may request a new medical treatment for a patient. The request is sent to the claims adjuster for an insurance company to adjust the amount of medical care that the patient is to receive to include the new medical treatment. The claims adjuster forwards the request to a utilization review entity. The utilization review entity may receive the medical records from the claims adjuster, which may be incomplete healthcare records from the medical provider. On the limited information, the utilization review can deny or accept the requested medical treatment. If the request is accepted, this authorization may be communicated to health care provider to administer the particular treatment. If the request is denied, the denial of the request may be faxed to the health care provider and the process of appeal is time contingent within ten days of receipt of denial.

The requirements for calling and faxing information between entities is again based on the distributed and distinguishable entities involved in the workers compensation process, and may also be based on the technical requirements to keep some of the medical and legal information secure and separate from other entities involved in the workers compensation process. With the current inefficient system of fax, email, and phone call communications, these messages and documents are often lost or delayed. The health care and health outcome of the injured worker suffers. As such, the implications related to the poor communication and case management of these workers compensation claims extend far beyond just prolonged health care costs, including prolonged disability costs and increased infrastructure or personnel costs for insurance companies, health care providers, absenteeism, and wage loss costs to employer, in addition to trying to keep the data secure and timely directed to the appropriate user devices and entities to handle the workers compensation claims.

Embodiments described herein can provide a medical software platform for enabling expedited and authenticated communications between various workers' compensation entities. For example, the medical software platform can receive workers' compensation healthcare and claim data as it is determined and identify relevant parties and deadlines that need to receive and respond to the data. This information may be associated with a patient profile. The medical software platform can provide various end users with instructions and data on how to follow and navigate the care of a worker compensation patient. The medical software platform can reduce the overall time in providing timely treatment to the patients and ensure that all the entities involved in the care of the patient are all on the same page.

Technical advantages are realized throughout. For example, traditional processes may rely on faxing information between disconnected systems, since the systems are used by very different parties in different technical capacities. There is no overarching entity empowered to manage the flow of information, authenticate user devices, and keep track of deadlines. The computing system and methods described herein would provide a technically advanced platform for transmitting and tracking confidential data, which can help open lines of communication that are previously non-existent while still maintaining confidential patient data hidden from entities that are not permitted access to it.

The medical software platform may also streamline the worker compensation daily processes to increase technical compatibility with other systems, increase cost efficiency, improve productivity, improve communication, and minimize risk. For cost efficiency, streamlining may decrease the amount of paperwork done and require less staffing since data entry and processing can be done automatically. This can lead to reducing communication delay and saving time and money so that the funds can be allocated elsewhere. For improved productivity, employees can become more productive and they can have a more accurate idea of the daily tasks and expectations assigned to them. They can focus more on the quality of what they are producing when unnecessary tasks are reduced. For improved communications, the communications may be improved between departments and entities involved in the care of patient and can allow for better tracking of completed tasks. For minimized risk, businesses with streamlined processes may have greater transparency. It may be easier to capture the progress of patients and notice mistakes or missed deadlines from one location like the platform, especially when notices are provided for those deadlines that originate from different systems.

FIG. 1 illustrates a medical software platform and one or more user devices, in accordance with embodiments of the application. Medical software platform 102 and one or more user devices 130 may communicate via a network.

Medical software platform 102 may comprise one or more processors, controllers, control engines, or other processing devices, such as processor 103A. Processor 103A might be implemented using a general-purpose or special-purpose processing engine such as, for example, a microprocessor, controller, or other control logic.

Medical software platform 102 might also include one or more memory 103B and machine readable media 103C. For example, memory 103B and/or machine readable media 103C may comprise random-access memory (RAM) or other dynamic memory, might be used for storing information and instructions to be executed by processor 103A. Memory 103B and/or machine readable media 103C might also be used for storing temporary variables or other intermediate information during execution of instructions to be executed by processor 103A. Memory 103B and/or machine readable media 103C might likewise include a read only memory ("ROM") or other static storage device coupled to a bus for storing static information and instructions for processor 103A.

Medical software platform 102 may comprise one or more modules that perform processes or operations. The modules may include, for example, data processing module 104, docketing module 106, notification module 108, interface module 110, and recommendation module 111.

Data processing module 104 may receive and process data from various data sources, including a medical record for a patient that filed a workers compensation claim. For example, data processing module 104 may provide an application programming interface (API) to receive and provide data in a predetermined format (e.g., structured data). Other types of data may be received and parsed according to a text processing algorithm or optical character recognition (OCR). The data may be stored in patient data store 112.

Data processing module 104 (with interface module 110) may generate a visual workflow of the data. For example, the visual representation of the path that the data take through the process, analysis, and current state by presenting data along an illustrative path using visual process elements.

Data processing module 104 may determine a medical record and/or analytics for a patient. The data may include which tests or medical treatments have been performed on the patient and how the patient is responding to the tests (e.g., through test results determined by a lab technician) or treatments (e.g., through feedback and responses from the patient or physician documenting responses).

As a sample illustration, a medical treatment for a particular patient may be to perform surgery. Data processing module 104 may compare the type of surgery and test results collected from the patient before and after the surgery with other patients that had similar surgeries to help determine how the patient is reacting to the particular treatment. The progression of the patient's health and/or test results may be determined from one or more tests and uploaded in association with a timeline. The health progression of a first patient may be compared to other patients to determine whether the time that the first patient takes to heal and recover is common or different than the other patients. The comparison between the first patient and other patients may help identify identifying commonalities between the timelines, tests, and results in order to determine different medical treatments and expediting recovery.

In some examples, future treatments may be altered based on the comparison between the first patient and other patients. In this example, the first patient may be originally scheduled to perform twelve physical therapy sessions after the surgery as a customary treatment after the particular type of surgery. The therapy may be adjusted or removed based on the analytics and comparison with the other patients to help increase the likelihood of recovery for the first patient.

Data processing module 104 may compare patient data corresponding to the patient's recovery with approvals or denials of medical treatment. For example, when an entity denies a medical treatment for a patient, a timeline of recovery for a plurality of similar patients to the first patient without the medical treatment may be compared to other patients that received the medical treatment. Data processing module 104 can predict the length of recovery time for the first patient based on the comparison with other patients with similar attributes, and provide the prediction to one or more user devices 130, including the patient user device 130F, physician user device 130, or healthcare provider user device 130C.

Data processing module 104 may associate a medical treatment with a status of a patient. The status may include a binary determination (e.g., patient is better or not better, etc.) or a range of values (e.g., 0-10, etc.). The status and corresponding medical treatment may be stored in patient data store 112.

Data processing module 104 may comprise access control where access to the data is provided upon authentication of the user. The access control may define responsibilities and visibility according to the user's role, access level, and form data. The access controls may limit the accessibility to data and reports in accordance with the determined access level.

Docketing module 106 may determine deadlines and dates associated with data. Docketing module 106 may identify a triggering event (e.g., receiving a request for a new medical treatment, etc.) and determine a deadline associated with the triggering event (e.g., five days to approve/deny the request, etc.). A notification may be transmitted from medical software platform 102 to one or more user devices 130 to identify the triggering event, response, and deadline. The triggering event and corresponding deadline may be reliant on predetermined rules (e.g., state worker compensation guidelines, etc.) and stored in deadlines data store 114.

In some examples, docketing module 106 may update deadlines based on feedback from one or more entities. For example, a patient's attorney operating patient's attorney user device 130G may request ten days to produce information while the employer's attorney operating employer's attorney user device 130H may respond with fifteen days. The correspondence between the two entities may be tracked and stored, and/or provided to court authorities as evidence or case management. In some examples, when a deadline is updated, various systems may be automatically triggered to update as well. Medical software platform 102 may generate and transmit notifications of the updates, or automatically update data in the patient data store 112 or similar data repository. This may include docketing module 106 to update deadlines data store 114 with the new deadline and notification module 108 to alert one or more entities of the new deadline.

In another example, a physician operating physician user device 130A may request that the patient lifts ten pounds to return to work, but the employer operating employer user device 130E requests that the patient lift fifteen pounds to return to work. The correspondence between the two entities may be tracked and stored, and other processes may be triggered as well. For example, additional medical treatments may be ordered and requested for approval (e.g., from a claims adjuster, etc.) in order to ensure that the patient reaches the fifteen pound requirement.

In some examples, the medical treatment may be associated with an occupation of the patient or other information. For example, the fifteen pound requirement may be associated with a carpenter but not a data analyst, so the medical treatments to help the patient work up to lifting fifteen pounds may be required for the carpenter but not the data analyst.

Figure 2:
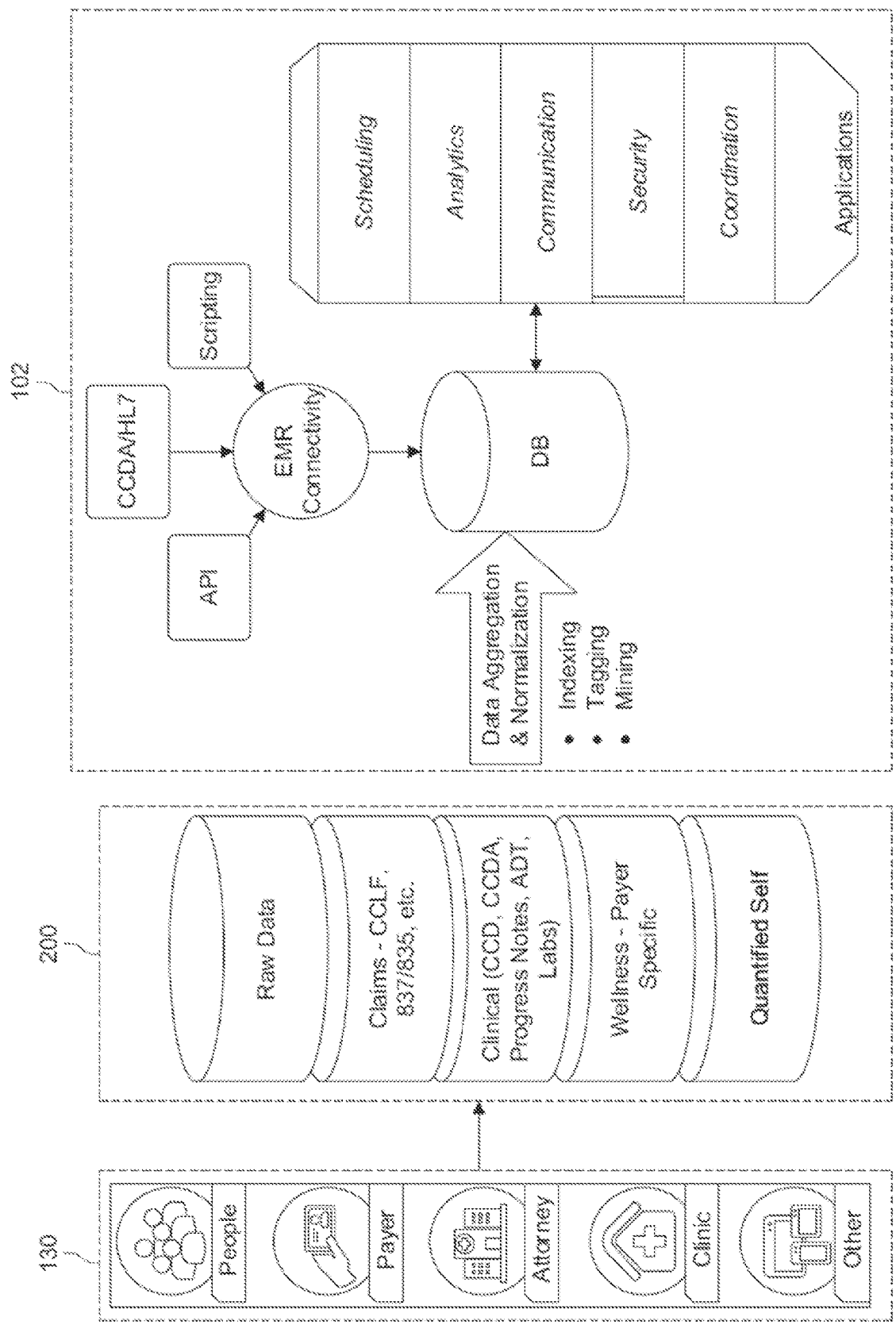
FIG. 2 illustrates a data processing and application processing method, in accordance with embodiments of the application.

An illustrative process for data processing and docketing implemented by data processing module 104 and docketing module 106 are illustrated in FIG. 2. For example, one or more user devices 130 may provide data 200 to medical software platform 102.

Data 200 may comprise claims data, clinical data, wellness data, data from the user, or other relevant data to medical software platform 102.

Claims data may comprise claims and claim line feed (CCLF) file data. For example, claims data may comprise a unique identifier assigned to the claim, a facility's identification number associated with a Medicare or Medicaid program, a Medicare beneficiary identifier assigned to the beneficiary, a claim type code, a claim from date, a claim through date, a claim bill facility type code, a claim bill classification code, a principal diagnosis code, an admitting diagnosis code, a claim Medicare nonpayment reason code, a claim payment amount, a claim primary payer code, a Federal information processing standard (FIPS) code, a beneficiary patient status code, a diagnosis related group code, a claim outpatient service type code, one or more provider numbers, a claim adjustment type code, a claim effective date code, a claim load date code, or other information. In some examples, some of this information may identify the authentication or authorization level of the corresponding entity and medical software platform 102 may create access limits on the identified data for that user type. For example, the facility's identification number may identify that the provider is Medicare certified for a particular type of service.

Claims data may also comprise "837 data" or "835 data." For example, when a healthcare service provider submits an 837 Health Care Claim, the insurance plan may use a corresponding 835 file type to help detail the payment to that claim. Both of these form claims may correspond with electronic files that are submitted to help pay the claim through various entities.

Clinical data may comprise information generated by the physician operating a physician user device 130A. For example, clinical data may comprise one or more consolidated clinical documents, progress notes, admit/discharge/transfer information, laboratory test results, or other relevant data determined after performing a medical procedure on the patient.

Wellness data may comprise information generated by the patient associated with wellness activities and a corresponding date or duration. Some examples of wellness data correspond with social activities, nutrition, and physical activity.

Data from the user may comprise information provided by the patient. The data may be received periodically from a qualified user device associated with the patient user.

Once the data are received, medical software platform 102 may aggregate and normalize the data. For example, medical software platform 102 may index, tag, and mine the data for easy organization and faster retrieval. In some examples, the data may be normalized in order to correspond with a pre-existing format in the patient data store 112 as illustrated in FIG. 1 (e.g., unstructured to structured data).

Other sources of information may also be added to one or more databases, including patient data store 112, deadlines data store 114, and therapy data store 116. These may include provider inputs, provider recommendations, and/or corresponding appointments.

In combining multiple sources of data, medical software platform 102 can act as a data repository for multiple, distributed entities involved in the workers compensation process. Medical software platform 102 may be a single platform where each entity can request and receive data relating to medical, work status, and claims management data for the patient.

Additionally, medical software platform 102 can provide functionality to enable real-time communications between entities associated with the workers compensation process. For example, the communications may help share real time data through a portal associated with medical software platform 102 (e.g., via an API accessible with authentication credentials). In some examples, medical software platform 102 may provide the capability for instant messaging and video communication between any combination of the entities, as illustrated with FIG. 4.

As illustrated in FIG. 2, the stored data may be accessed by medical software platform 102 to populate one or more applications. The applications may be executed using machine readable instructions at one or more user devices 130 or medical software platform 102. The applications may include, for example, a scheduling application, an analytics application, a communication application, a security application, and a coordination application.

The scheduling application may comprise a list of available dates and times for patients to visit the provider. Various medical tests may be performed during the scheduled time and data generated from the tests may be transmitted to medical software platform 102 and stored.

The analytics application may comprise machine readable instructions to learn patterns and inferences from the data associated with the patient and also apply machine learning to detect similarities between a first patient and other patients. The analytics application may determine tests or remedies for the first patient (e.g., to decrease the recovery time).

The communication application may interact with various communication platforms, including email, instant messaging, or video, to transmit electronic communications from one user device to another. For example, a visit between a physician and a patient may be conducted using the communication application (e.g., to help move the case forward).

The security application may implement data security corresponding with data and accessibility limitations by various entities that interact with medical software platform 102. security application may help ensure that the right data is presented in read, write, and/or update format to the appropriate entity based on their access rights or other rules.

The coordination application may coordinate entities to interact with each other, either through a virtual or physical environment. For example, when a next step in a workers compensation claim fulfillment process is to meet with a physician or attorney, the coordination application may first identify an existing physician or attorney associated with the patient (e.g., stored in a patient data store 112 or other preexisting data). When the particular entity is not previously identified, coordination application may access a list of entities that match that profile description and provide one or more identifiers of entities from the list to the patient. The coordination application may bring together the right provider to take care of the patient.

Figure 3:
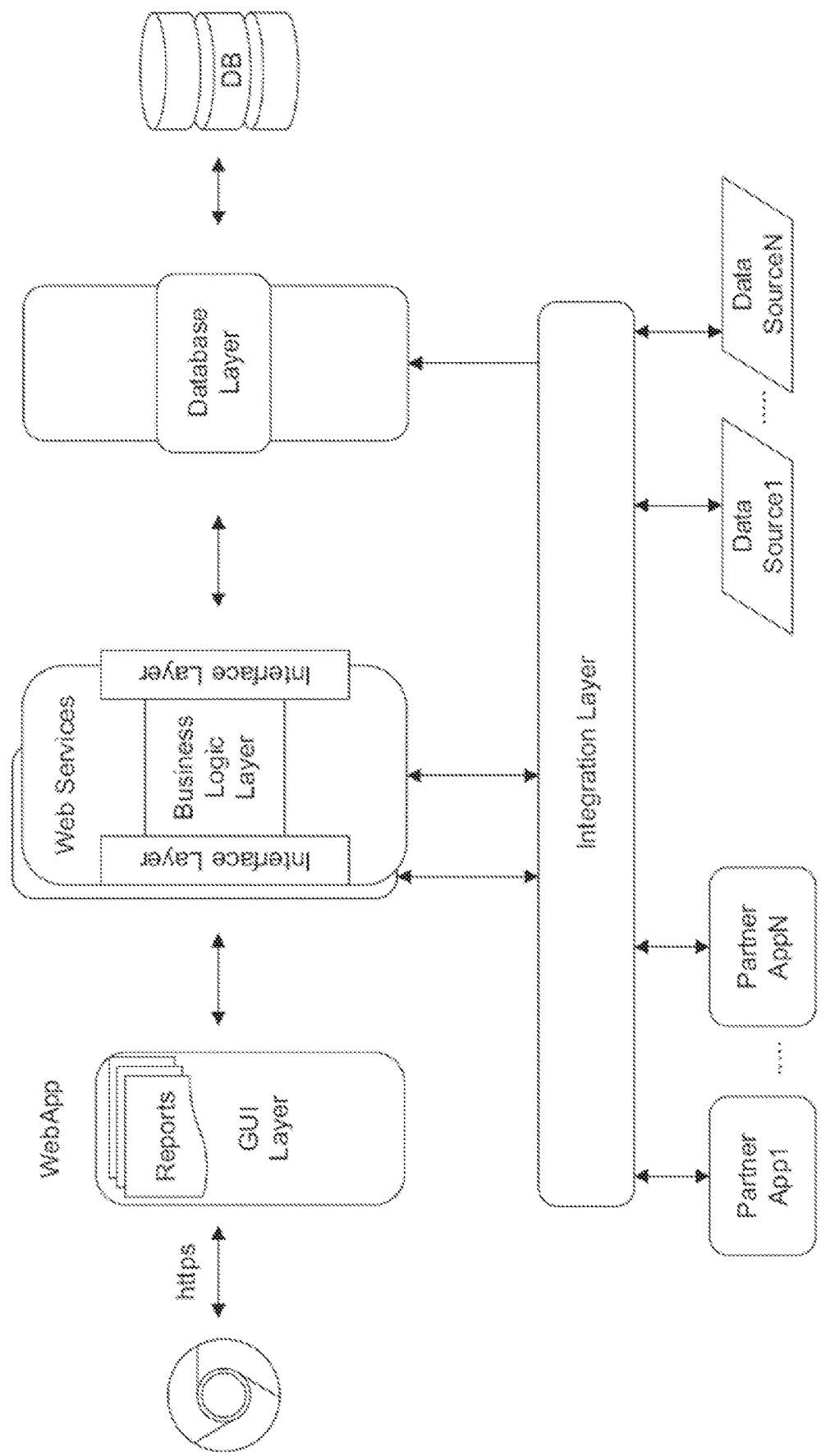
FIG. 3 is an illustration of an integration layer of medical software platform for populating one or more applications, in accordance with embodiments of the application.

FIG. 3 is an illustration of an integration layer of medical software platform 102 for populating one or more applications, in accordance with embodiments of the application. For example, various application layers of medical software platform 102 may be generated, including a graphical user interface (GUI) layer, business logic layer, database layer, and integration layer. The GUI layer may provide data, reports, alerts, or other information to the user devices 130, using data received from the business logic layer of medical software platform 102. The business logic layer may correspond with one or more modules described with respect to FIG. 1. The business logic layer may receive data from the database layer of medical software platform 102, including patient data store 112, deadlines data store 114, or therapy data store 116.

The integration layer of medical software platform 102 may interact with the business logic layer and/or the database layer to receive data, reports, alerts, or other information. This data may be reformatted or otherwise transmitted to partner applications or data sources for other uses.

Figure 4:
FIG. 4 illustrates a communication interface, in accordance with embodiments of the application.
Figure 4:
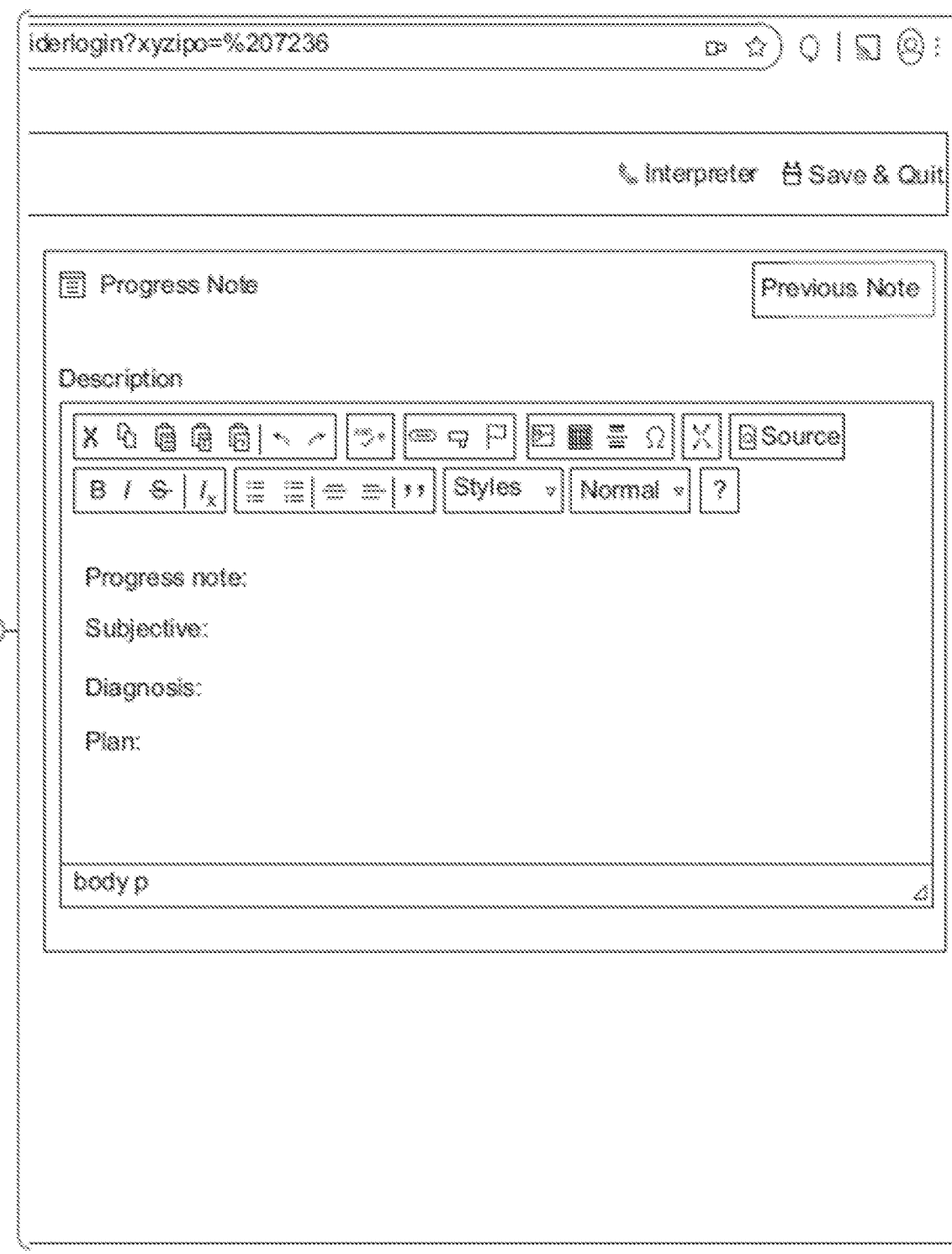

FIG. 4 illustrates an communication interface, in accordance with embodiments of the application. Data may be received at medical software platform 102 when captured through the communication interface. For example, a patient and a physician may visually see each other and speak via microphones and speakers incorporated with their individual user devices. In other examples, the patient and physician may exchange text messages or other forms of communication. As the communication is occurring, the physician entity may generate additional user data for the patient, which can be stored with the user file in medical software platform 102, including progress notes, subjective outcome, diagnosis, or health care plan based on what was discussed. The information may be stored directly to patient data store 112 for real-time data gathering and updates.

Returning to FIG. 1, notification module 108 may generate one or more notifications for the plurality of users. The notifications may be predetermined to identify one or more entities that will be alerted to receiving data (e.g., when any data are uploaded to the platform, etc.) or may be determined in real-time (e.g., when the data are uploaded and defined by the uploading user, etc.).

Notification module 108 (in association with docketing module 106) may generate and transmit a notification to a user to identify an upcoming deadline. The notification may identify the data that is requested and request that the user provide the data (e.g., patient data, case report, new therapy suggestion, approval/denial of requested medical treatment, etc.).

As an illustrative example, notification module 108 may generate and transmit a notification to a claims adjuster operating a claims adjuster user device 130D or other entity, including any other entities operating user devices 130. The notification may identify a deadline for providing, reviewing, or analyzing information for responding to the medical treatment administered in association with the workers compensation claim.

Multiple notifications may be generated and transmitted in accordance with the deadline (e.g., to help move the workers compensation claim forward and meet all the deadlines). For example, when the deadline is within a threshold (e.g., within a day or week, etc.), notification module 108 may automatically transmit a second notification to the claims adjuster (e.g., to provide the information within the deadline associated with the workers compensation claim) and automatically transmit a third notification to the patient associated with the deadline (e.g., to notify the patient of the status of the workers compensation claim).

Interface module 110 may provide a user interface for receiving and providing patient and case data. The interface may be accessible via a web browser operated at a user device 130.

Interface module 110 may provide a fluid layout. The fluid layout may be generated using one or more user interface tools to create a customizable visual layout of data in an easy to read format with one or more data elements shown together.

Interface module 110 may comprise a customized interface to match the entity and/or user device accessing medical software platform 102. For example, medical software platform 102 may determine the entity accessing medical software platform 102 and adjust the interface (via interface module 110) to provide information in accordance with settings defined by the entity. For example, when the entity prefers to view a monthly therapy report about a patient (e.g., claims adjuster, etc.), the interface may match an identifier or login credential associated with the user device (e.g., as the claims adjuster) to the entity logging in and provide the requested report automatically. Interface module 110 may provide custom and/or standardized forms that allow the entity to adjust everything from reporting and data elements to the data sources.

Recommendation module 111 may generate reports and analytics. For example, recommendation module 111 may determine insights into patient records with customizable dashboards and reports that can give users the information they need to improve the health of the patient within various time constraints.

Recommendation module 111 may determine one or more therapies based on the change in feedback over time. For example, at day one, the patient may experience a first level of pain and at day ten, the patient may experience a second level of pain. Based on the change in pain level from the first level to the second level, recommendation module 111 may select a therapy from therapy data store 116 that corresponds with the changing pain level.

In some examples, the change in pain level (or other data metrics) may be compared with a threshold for the particular patient (stored with the patient profile) or for the particular injury. This may include a threshold associated with a first patient that is different than a threshold associated with a second patient. The rate of change compared with the threshold can help determine which therapy should be recommended by the platform (e.g., based on a set of rules of the platform).

Recommendation module 111 may help determine and provide a suggestion for a date when the patient should return to work. For example, the pain level (or other data metrics) identified by the patient may be compared to a threshold. When the pain level is below the threshold, the recommendation may include reaching out to a physician to perform additional tests to determine whether the patient is permitted to return to work. When the pain level is below the threshold, the recommendation may include providing an estimated return to work date.

In some examples, recommendation module 111 may enable monitoring of patient progress via medical software platform 102, as physicians and other entities engage in various aspects of individual or group treatment. For example, recommendation module 111 may standardize pain scores or other data, including sensor based recordings or self-reported symptoms. In some examples, recommendation module 111 may compare the pain scores or other data to a threshold value. When the pain score exceeds the threshold value, recommendation module 111 can alert health care providers or other entities that the health of the patient is falling below the threshold level. As illustrative examples, the recommendation module 111 may notify the health care provider that the mental health of the patient is at a dangerous level (e.g., below the threshold value), or that the activity or nutritional level is beyond a certain range from a threshold or baseline value.

One or more data stores may comprise patient data store 112, deadlines data store 114, and therapy data store 116. The data stores may be accessible by one or more entities or applications, and may be restricted access unless the entity is a qualified provider that can help provide treatment in addition to independent evaluation of third party cases.

Patient data store 112 may comprise complete healthcare data of the patient as well as any worker compensation claim data associated with the patient. The worker compensation claim data may vary by state, which governs the laws associated with worker compensation. Benefits provided to the patient may also be stored. The benefits may include cash or wage-loss benefits, medical and career rehabilitation benefits, and in the case of accidental death of an employee, benefits to dependents.

Deadlines data store 114 may comprise a list of time limits that may be triggered from receiving or providing data to one or more user devices 130. Each of the time limits may correspond with a triggering event that is associated with a date (e.g., a task must be completed by a certain date) or another action (e.g., a task must be completed in response to the completion of another task).

Therapy data store 116 may comprise a list of therapies that may be suggested to the patient. The therapies may be suggested to the patient upon satisfying one or more conditions of the patient (e.g., patient has X injury that is cured by Y medication, etc.) or when an output of a machine learning model suggests the therapy (e.g., patients with X symptoms in the past have been cured with Y therapies 90% of the time, etc.).

One or more user devices 130 may be implemented. Each user device 130 may comprise a hardware processor (e.g., one or more central processing units (CPUs), semiconductor-based microprocessors, and/or other hardware devices) suitable for retrieval and execution of instructions stored in a machine-readable storage medium. The hardware processor may fetch, decode, and execute instructions to control processes or operations for optimizing the system during run-time. As an alternative or in addition to retrieving and executing instructions, hardware processor may include one or more electronic circuits that include electronic components for performing the functionality of one or more instructions, such as a field programmable gate array (FPGA), application specific integrated circuit (ASIC), or other electronic circuits.

The machine-readable storage medium may be any electronic, magnetic, optical, or other physical storage device that contains or stores executable instructions. This may include a Random Access Memory (RAM), non-volatile RAM (NVRAM), an Electrically Erasable Programmable Read-Only Memory (EEPROM), a storage device, an optical disc, and the like.

In some examples, user devices 130 may each correspond with one or more stakeholders can have authentication credentials (e.g., login username and password, etc.). User devices 130 may transmit the authentication credentials to an user interface associated with medical software platform 102. Once authenticated, the user may view and/or modify the patient data accessed from patient data store 112. This information may only be accessed by logging into the system.

To help increase data security of medical software platform 102, access and transmissions of the data may be restricted. In some examples, neither the patient data nor past or future treatments may be transmitted from medical software platform 102 to any user device 130. The transmissions may be limited to processed data or generated reports. In other examples, only authenticated users with medical or legal clearance may access confidential data (e.g., medical treatments, health information, patient responses to medical or legal questions, etc.), which may further increase security of the data collected.

Physician user device 130A may be operated by a physician or agent of the physician that is providing medical care to the patient. These users are the providers involved in the care of a patient, including for example, primary care physicians or ancillary care providers including psychologists, chiropractors, acupuncturists, and specialists like orthopedic surgeons.

Nurse case manager user device 130B may be operated by a nurse case manager. The nurse case manager may be responsible for helping an injured worker obtain the medical care that he or she needs (e.g., corresponding with the workers compensation claim or injury).

Healthcare provider user device 130C may be operated by a healthcare provider. Although the healthcare provide may be a physician, the healthcare provider may comprise any doctor of medicine who is authorized to practice medicine or surgery, including podiatrists, dentists, clinical psychologists, optometrists, chiropractors, nurse practitioners, nurse-midwives, clinical social workers, physician assistants, or other entities who are authorized to practice under state law and who are performing within the scope of their practice as defined under state law.

Physician user device 130A, nurse case manager user device 130B, or healthcare provider user device 130C may be responsible for providing additional information in association with an incomplete healthcare record from the medical provider. For example, medical software platform 102 may identify that patient data that is incomplete (e.g., missing treatments, health data, profile data, etc.) and generate and transmit an alert through notification module 108 to request the missing records from one of these entities.

Claims adjuster user device 130D may be operated by a claims adjuster. A claims adjuster investigates worker compensation claims to determine whether the claimant can receive care pursuant to one or more predefined rules. Claims adjusters can handle many cases, answer many telephone calls and emails, and sift through volumes of paperwork.

Employer user device 130E may be operated by an employer of the patient. The employer may provide a place of employment for the patient (e.g., where the patient works and was injured). Employer user device 130E may access aggregated patient data (e.g., associated with an occupation, recovery time, etc.) to help improve workplace conditions and help prevent future injuries.

Patient user device 130F may be operated by a patient and/or employee of the employer. Patient may seek care for his/her injury from a physician. Patient user device 130F may access medical software platform 102 through a web browser or other software application stored on patient user device 130F to help identify a status of a medical treatment or claim.

Patient user device 130F may also include an interface to view reports or alerts generated by medical software platform 102 either locally or remotely from the device. Patient user device 130F may access medical software platform 102 via a web-based interface. The patient profile may be incorporated with the recommendations locally at the user device or remotely at medical software platform 102 as well.

Various user devices may be operated by attorneys involved in a dispute related to a workers compensation claim, including patient's attorney user device 130G and employer's attorney user device 130H. Patient's attorney user device 130G may be operated by a patient's attorney and employer's attorney user device 130H may be operated by an employer's attorney.

Fee negotiator user device 130I may be operated by a fee negotiator. The fee negotiator may act as a middle man between two entities (e.g., hospitals and the workers compensation insurance company) to help align costs with industry standards and eliminate exorbitant claims through negotiation.

Insurance provider user device 130J may be operated by an insurance provider. The insurance provider may provide workers compensation insurance (or other business insurance) to an employer of the patient. The workers compensation insurance provides benefits to employees who suffer work-related injuries or illnesses.

Figure 5:
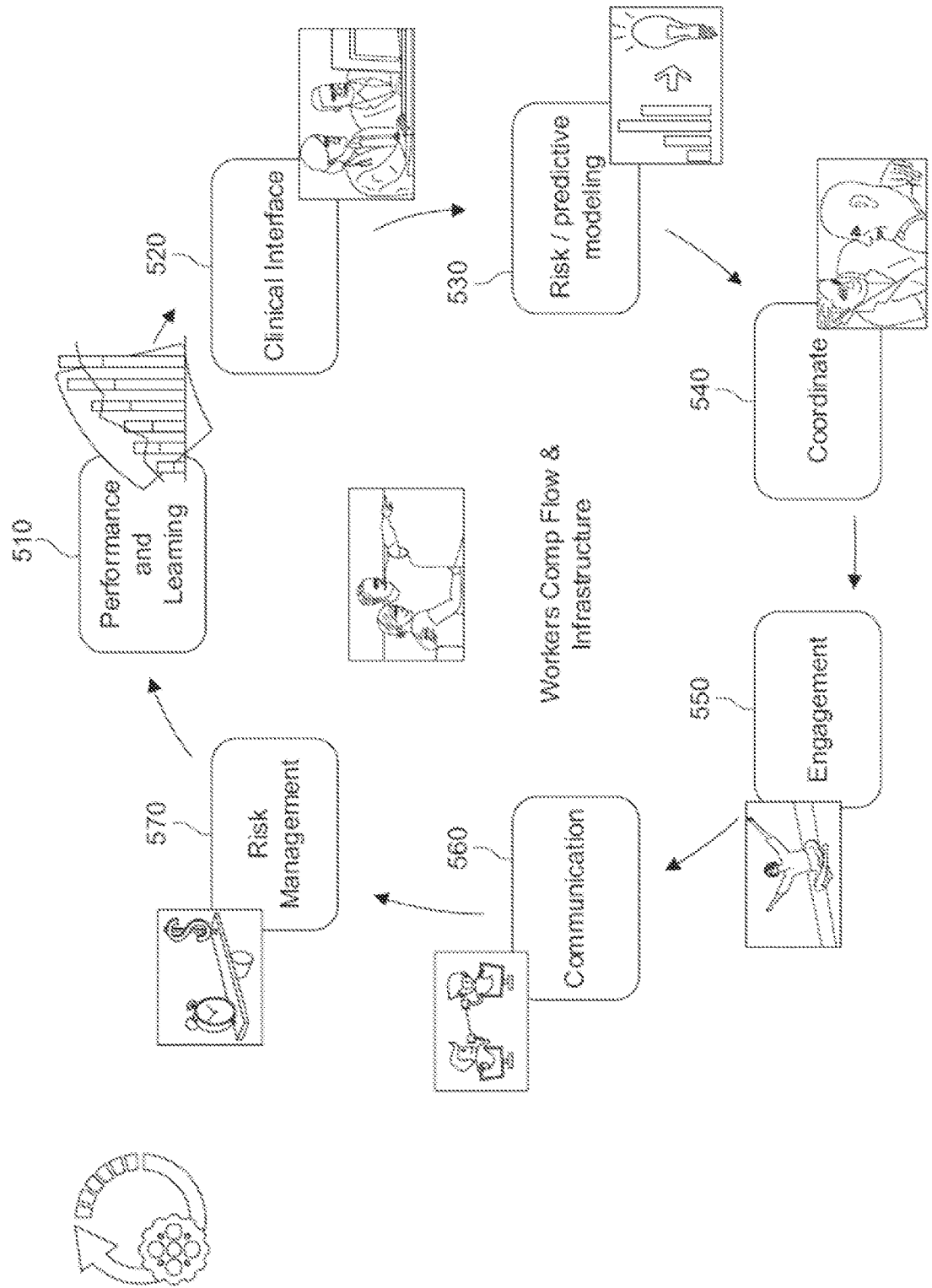
FIG. 5 illustrates a worker compensation feedback loop, in accordance with embodiments of the application.

FIG. 5 illustrates a worker compensation software feedback loop, in accordance with embodiments of the application. In this illustration, medical software platform 102 may continually update patient data for each of the entities associated with the workers compensation process. In some examples, medical software platform 102 may continuously analyze the data to determine patterns or self-evolve and provide better quality of care.

At block 510, the process may include performance and learning. During performance and learning, medical software platform 102 may receive patient data from one or more entities and make it available to other entities. In some examples, the access to data may be restricted to authorized users to increase the security of patient data and expedite communication flow with relevant data readily accessible.

At block 520, the process may provide a clinical user interface. For example, medical software platform 102 may provide a user interface for one or more user devices to access patient data or reports, based on various access rights as discussed herein.

At block 530, the process may initiating a risk or predictive modeling through artificial intelligence. For example, the modeling may process patient data and determine correlations between the patient data, injuries, time frames, treatments, and other factors, for example, by identifying a first threshold number of similar input features that lead to a second threshold number of similar output features. By continuing to receive new data, the predictive modeling can continue to evolve to better predict patient treatment outcomes.

As an illustrative example, medical software platform 102 may initiate a risk or predictive modeling process through artificial intelligence. The risk or predictive modeling process may correlate the patient data (e.g., from a medical record) with a time frame and a treatment (e.g., where a particular treatment was effective for a particular injury within a particular time frame). Upon identifying a first threshold number of similar input features (e.g., in the patient data) that lead to a second threshold number of similar output features (e.g., the time frame or treatment), providing the time frame and the treatment to the patient. The time frame and the treatment may be provided as a notification to the patient of a potentially effective treatment plan for their injury under the workers compensation claim.

At block 540, the process may initiate coordination processes. The coordination may identify multiple entities to refer patients or practitioners for patient care or other involvement with the medical software platform 102. The referrals can be evaluated for distance, timeliness, and quality of care. Referrals may be weighted based on these metrics and more importance will be given to referrals who have demonstrated better and timeliness quality of care.

At block 550, the process may initiate an engagement process. The engagement process may be initiated by medical software platform 102 between the patient and provider or other entities. In some examples, the engagement process may guide the patient on self-healing or a treatment plan with the provider.

At block 560, the process may initiate a communication process. The communication process may be initiated by medical software platform 102 between all stakeholders for faster resolution of any issue related to stagnant patient care. For example, when an approval is waiting for a particular entity, the communication process may alert the entity that the workers compensation process is waiting for them, and may also alert other entities that the workers compensation process is waiting for a particular entity. Each of the stakeholders may be aware of the status of the case, including the patient.

At block 570, the process may initiate a risk management process. With the intelligence gathered by predictive modeling module at block 530 (e.g., by data processing module 104 or recommendation module 111), the risk management process can generate a recommendation for one or more treatment plans. The recommendation may be based at least in part on patient or employer's finances, time, risk, and treatment, where each of these factors may be weighted for the particular case.

Figure 6:
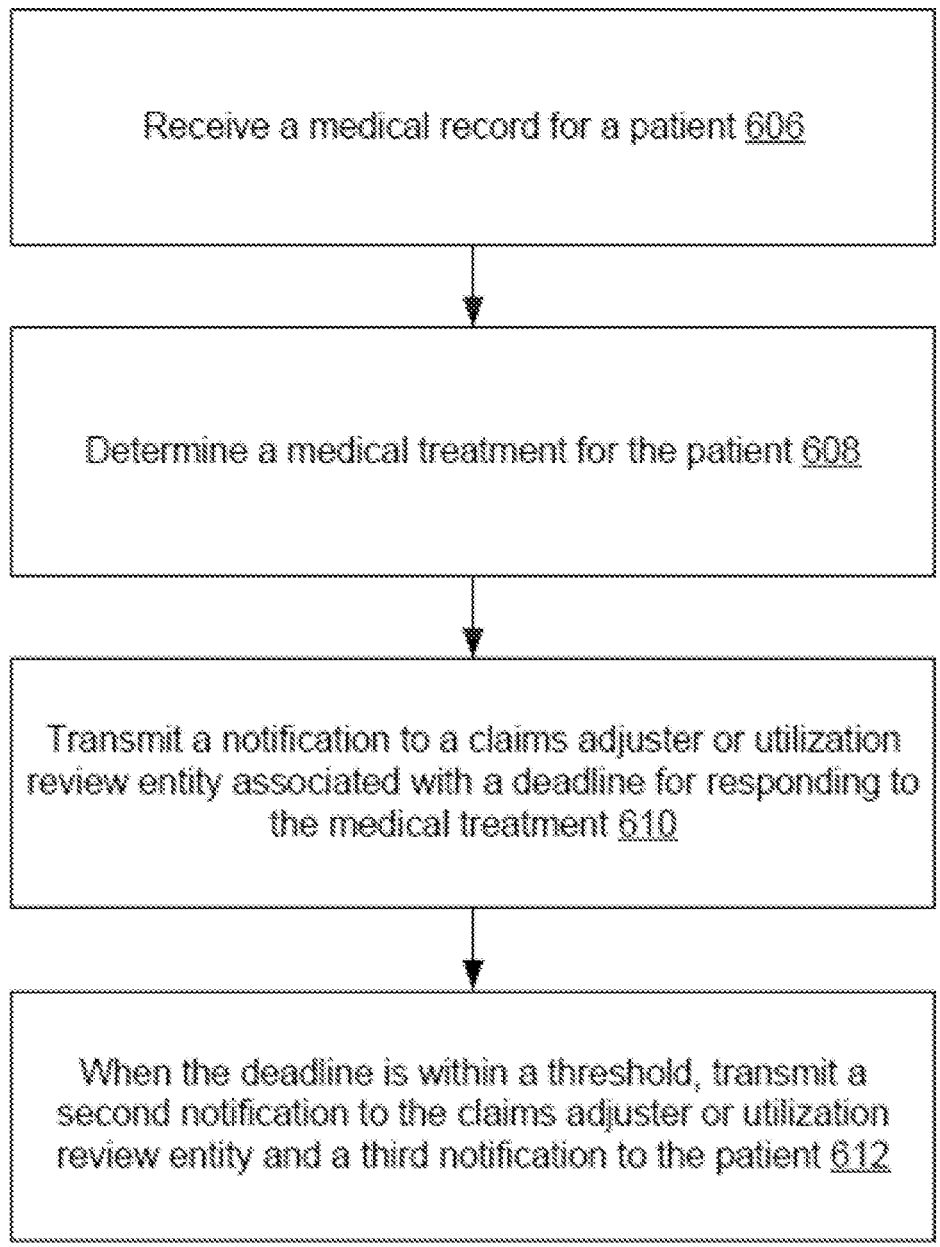
FIG. 6 illustrates a method for providing medical analytics, in accordance with embodiments of the application.

FIG. 6 illustrates a method for providing medical analytics, in accordance with embodiments of the application. The method may be implemented by medical software platform 102 of FIG. 1.

At 606, a medical record may be received for a patient. The medical record may be associated with a workers compensation claim.

At 608, a medical treatment may be determined for the patient. The requested medical treatment may be prescribed by a physician and submitted to a claims adjuster to determine if the requested medical treatment is approved by the employer's insurance carrier. In some examples, the claims adjuster may forward the medical treatment to a utilization review entity to help determine if the requested medical treatment is approved or denied.

At 610, a notification may be transmitted. The notification may be sent to the claims adjuster or the utilization review entity to identify a deadline for responding to the request. The deadline may be associated with state laws defining workers compensation claims, a court deadline that is managing and reviewing medical treatments for the patient, and/or other rules that define deadlines.

At 612, a second and/or third notification may be transmitted. The second notification may be generated and transmitted when the deadline is within a threshold date of the current date. The second notification may be sent to the claims adjuster or the utilization review entity to help ensure that the entity provides the response by the deadline. The third notification may be transmitted to the patient in association with the deadline, for example, to notify the patient of the status of their workers compensation claim.

Figure 7:
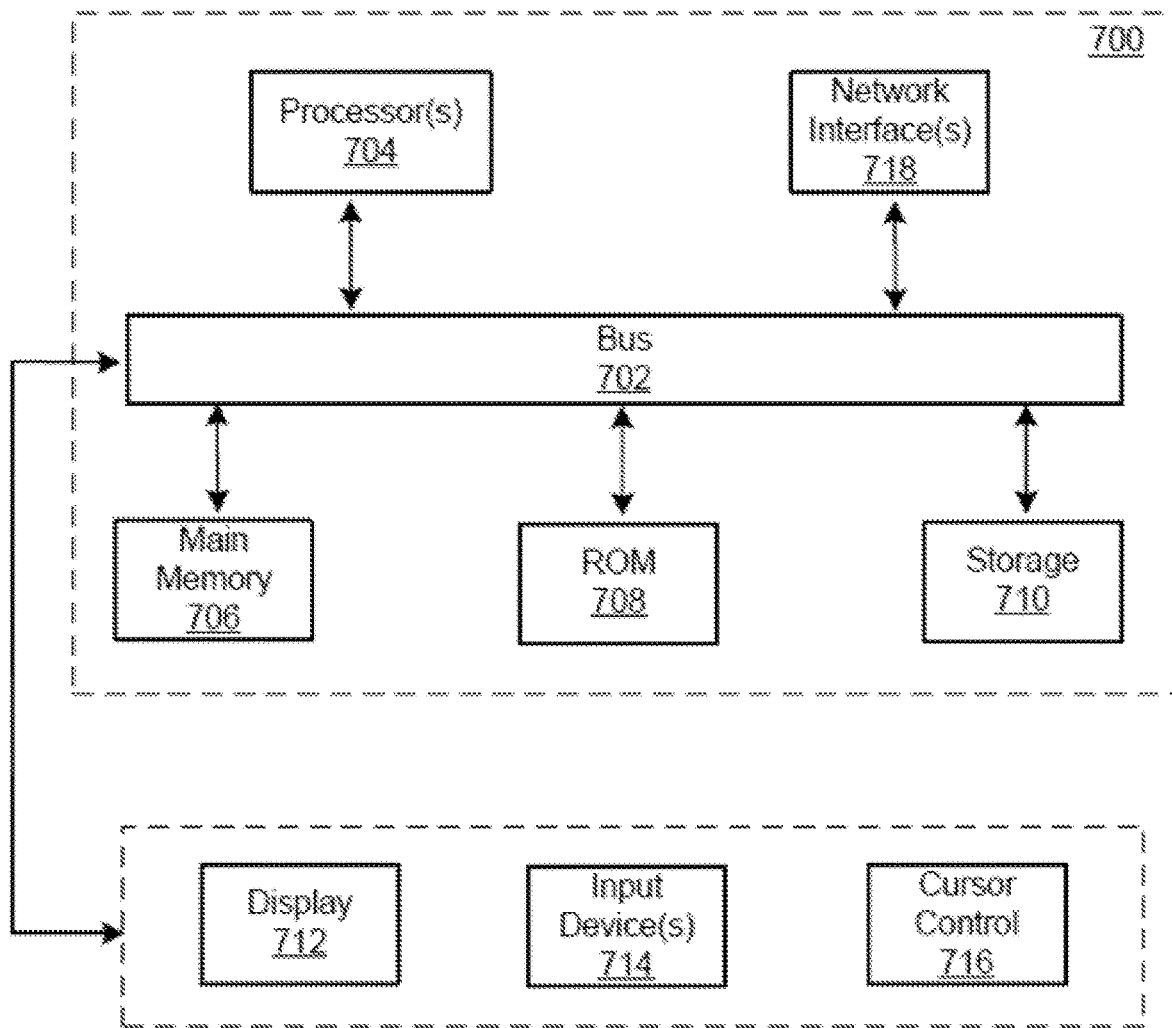
FIG. 7 is an example computing component that may be used to implement various features of embodiments described in the present disclosure.

FIG. 7 depicts a block diagram of an example computer system 700 in which various of the embodiments described herein may be implemented. Computer system 700 can be implemented with virtual components in a cloud environment or in a physical data center. In either implementation, computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for enabling expedited and authenticated communications between a plurality of entities administering a workers compensation claim for a patient, the method comprising:
    storing, in a structured format, data related to the patient in a database layer of a medical platform;
    providing remote access to users over a network such that each user can update and view, via a graphical user interface (GUI) layer of the medical platform, information about the patient in real-time, wherein the users comprise the patient, a claims adjuster, and a physician of the patient;
    receiving, via the GUI layer of the medical platform, a medical record of the patient from a device of the physician, wherein the medical record is in one or more first unstructured formats;
    receiving, via the GUI layer of the medical platform, the workers compensation claim for the patient from a device of the claims adjuster, wherein the workers compensation claim is in one or more second unstructured formats;
    converting, in real-time, the medical record from the one or more first unstructured formats to the structured format used to store patient data in the database layer of the medical platform and storing the structured medical record in the database layer;
    converting, in real-time, the workers compensation claim from the one or more second unstructured formats to the structured format used to store data in the database layer and storing the structured workers compensation claim in the database layer;
    based on the structured medical record and the structured workers compensation claim, determining, in real-time, a medical treatment for the patient;
    transmitting, in real-time via the GUI layer of the medical platform, a notification to the device of the claims adjuster associated with a deadline for responding to the medical treatment administered in association with the workers compensation claim;
    when the deadline is within a threshold, automatically transmitting, via the GUI layer of the medical platform, a second notification to the device of the claims adjuster and automatically transmitting, via the GUI layer of the medical platform, a third notification to a device of the patient associated with the deadline being within the threshold;
    initiating a risk or predictive modeling through artificial intelligence by correlating the converted medical record with a time frame and the medical treatment; and
    upon identifying a first threshold number of similar input features that lead to a second threshold number of similar output features based on the correlating;
    generating an enhanced treatment plan based on the risk or predictive modeling, and
    providing, via the GUI layer of the medical platform to the device of the patient, digital content describing the enhanced treatment plan.

2. The method of claim 1, wherein, when the medical record for the patient is incomplete, the method further comprises:

generating and transmitting, via the GUI layer of the medical platform, an alert to the device of the physician requesting the medical record for the patient that is missing.

3. The method of claim 1, wherein the deadline is five days under labor code law.

4. The method of claim 1, wherein the deadline is based on state worker compensation guidelines.

5. The method of claim 1, further comprising:
transmitting, via the GUI layer of the medical platform, a fourth notification to a device of a health care provider to construct a return to work plan based on the medical treatment for the patient; and
upon receipt of the return to work plan, transmitting, via the GUI layer of the medical platform, the return to work plan immediately to a device of an employer of the patient.

6. The method of claim 1, wherein the medical treatment is based on an occupation of the patient associated with the workers compensation claim.

7. The method of claim 1, further comprising:
altering future medical treatments based on a comparison between the patient and other patients.

8. The method of claim 1, further comprising:
comparing patient recovery with approvals or denials of other medical treatments;
predicting a timeline for recovery associated with the approvals or the denials of the other medical treatments; and
providing, via the GUI layer of the medical platform, the timeline for recovery to the device of the patient or the device of the physician.

9. The method of claim 1, further comprising:
based on output generated by the risk or predictive modeling, generate a second medical treatment associated with a weighted risk for the patient.

10. The method of claim 1, further comprising:
based on output generated by predictive modeling, generate a patient care trajectory based on time and patient and employer's finances.

11. A system for enabling expedited and authenticated communications between a plurality of entities administering a workers compensation claim, the system comprising:
a graphical user interface (GUI) layer;
a database layer;
memory; and
one or more processors configured to execute machine readable instructions stored in the memory for performing a method comprising:
storing, in a structured format, data related to a patient in the database layer;
providing remote access to users over a network such that each user can update and view, via the GUI layer, information about the patient in real-time, wherein the users comprise the patient, a claims adjuster, and a physician of the patient;
receiving, via the GUI layer, a medical record of a patient from a device of the physician;
receiving, via the GUI layer, the workers compensation claim for the patient from a device of the claims adjuster, wherein the workers compensation claim is in one or more second unstructured formats;
structuring, in real-time, the medical record from the one or more first unstructured formats to the structured format used to store data in the database layer and storing the structured medical record in the database layer;
structuring, in real-time, the workers compensation claim from the one or more second unstructured formats to the structured format used to store data in the database layer and storing the structured workers compensation claim in the database layer;
based on the structured medical record and the structured workers compensation claim, determining a medical treatment for the patient;
transmitting, via the GUI layer to the device of the claims adjuster, a notification associated with a deadline for responding to the medical treatment administered in association with the workers compensation claim;
when the deadline is within a threshold:
automatically transmitting, via the GUI layer to the device of the claims adjuster, a second notification to the device of claims adjuster associated with the deadline for responding to the medical treatment, and
automatically transmitting, via the GUI layer to a device of the patient, a third notification associated with the deadline being within the threshold;
initiating a risk or predictive modeling through artificial intelligence by correlating the structured medical record with a time frame and the medical treatment; and
upon identifying a first threshold number of similar input features that lead to a second threshold number of similar output features based on the correlating;
generating an enhanced treatment plan based on the risk or predictive modeling, and
providing, via the GUI layer to the device of the patient, digital content describing the enhanced treatment plan.

12. The system of claim 11, wherein when the medical record for the patient is incomplete, the method further comprises:
generating and transmitting, via the GUI layer, an alert to the device of physician requesting the medical record for the patient that is missing.

13. The system of claim 11, wherein the deadline is based on state worker compensation guidelines.

14. The system of claim 11, wherein the method further comprises:
transmitting, via the GUI layer, a fourth notification to a health care provider to construct a return to work plan based on the medical treatment for the patient; and
upon receipt of the return to work plan, transmitting, via the GUI layer, the return to work plan immediately to an employer of the patient.

15. The system of claim 11, wherein the medical treatment is based on an occupation of the patient associated with the workers compensation claim.

16. The system of claim 11, wherein the method further comprises:
altering future medical treatments based on a comparison between the patient and other patients.

17. The system of claim 11, wherein the method further comprises:
comparing patient recovery with approvals or denials of other medical treatments;
predicting a timeline for recovery associated with the approvals or the denials of the other medical treatments; and
providing, via the GUI layer, the timeline for recovery to the device of the patient or the device of the physician.

18. The system of claim 11, further comprising one or more sensors configured to detect pain symptoms of the patient, and wherein the method further comprises:

computing a pain score for the patient based on data obtained from the one or more sensors; and comparing the computed pain score to a pain score threshold value; and when the computed pain score exceeds the pain score threshold value, automatically transmitting, via the GUI layer and a GUI of a device of a health care provider, a fourth notification, wherein transmitting the fourth notification comprises preventing devices other than the device of the health care provider from accessing the fourth notification.

19. The system of claim 11, wherein the method further comprises, upon identifying the first threshold number of similar input features that lead to the second threshold number of similar output features based on the correlating:

scheduling, via a scheduling application of the system, a video conference between the patient and the physician, and providing, via the GUI layer to the device of the patient, a real-time video stream of the video conference.

20. The system of claim 19, wherein scheduling the video conference between the patient and the physician automatically updates a calendar application of the device of the patient to record a date and time of the video conference in the calendar application of the device of the patient.

21. A non-transitory machine readable media storing a plurality of instructions executable by one or more processors, the plurality of instructions when executed by the one or more processors cause the one or more processors to:

store, in a structured format, data related to a patient in a database layer of a medical platform;

provide remote access to users over a network such that each user can update and view, via a graphical user interface (GUI) layer of the medical platform, information about the patient in real-time, wherein the users comprise the patient, a claims adjuster, and a physician of the patient;

receive, via the GUI layer of the medical platform, a medical record of a patient from a device the physician, wherein the medical record is in one or more first unstructured formats;

receive, via the GUI layer of the medical platform, a workers compensation claim for the patient from a device of the claims adjuster, wherein the workers compensation claim is in one or more second unstructured formats;

structure, in real-time, the medical record from the one or more first unstructured formats to the structured format used to store data in the database layer of the medical platform and storing the structured medical record in the database layer;

structure, in real-time, the workers compensation claim from the one or more second unstructured formats to the structured format used to store data in the database layer and storing the structured workers compensation claim in the database layer;

based on the structured medical record and the structured workers compensation claim, determine, in real-time, a medical treatment for the patient match an identifier or login credential of the device of the claims adjuster and adjust a GUI of the device of the claims adjuster to provide information in accordance with settings defined by the device of the claims adjuster;

transmit, via the GUI layer of the medical platform to the adjusted GUI of the device of the claims adjuster, a notification associated with a deadline for responding to the medical treatment administered in association with the workers compensation claim, wherein transmitting the notification comprises preventing devices not associated with the identifier or login credential of the device of the claims adjuster from accessing the notification;

when the deadline is within a threshold:

automatically transmit, via the GUI layer of the medical platform to the adjusted GUI of the device of the claims adjuster, a second notification associated with the deadline for responding to the medical treatment, wherein transmitting the second notification comprises preventing devices not associated with the identifier or login credential of the device of the claims adjuster from accessing the notification, automatically transmit, via GUI layer of the medical platform to a GUI of the device of the patient, a third notification associated with the deadline being within the threshold, wherein transmitting the third notification comprises preventing devices other than the device of the patient from accessing the third notification;

initiate a risk or predictive modeling through artificial intelligence by correlating the structured medical record with a time frame and the medical treatment; and upon identifying a first threshold number of similar input features that lead to a second threshold number of similar output features based on the correlating; generating an enhanced treatment plan based on the risk or predictive modeling, and provide, via the GUI layer of the medical platform to the GUI of the device of the patient, digital content describing the enhanced treatment plan.

22. The machine readable media of claim 21, wherein when the medical record for the patient is incomplete, the one or more processors are further to:

generate and transmit, via the GUI layer of the medical platform, an alert to the device of the physician requesting the medical record for the patient that is missing.

* * * * *